US012140900B2

(12) United States Patent
Tamura

(10) Patent No.: US 12,140,900 B2
(45) Date of Patent: Nov. 12, 2024

(54) TONER CONVEYING DEVICE INCLUDING FLEXIBLE SHEET IN DROP CONVEYANCE PASSAGE AND IMAGE FORMING APPARATUS

(71) Applicant: Tomonori Tamura, Kanagawa (JP)

(72) Inventor: Tomonori Tamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/143,615

(22) Filed: May 5, 2023

(65) Prior Publication Data

US 2023/0367255 A1 Nov. 16, 2023

(30) Foreign Application Priority Data

May 10, 2022 (JP) ................................. 2022-077450
Feb. 8, 2023 (JP) ................................. 2023-017409

(51) Int. Cl.
*G03G 21/10* (2006.01)
*G03G 15/08* (2006.01)
*G03G 21/12* (2006.01)

(52) U.S. Cl.
CPC ....... *G03G 21/105* (2013.01); *G03G 15/0891* (2013.01); *G03G 21/12* (2013.01); *G03G 2215/0827* (2013.01); *G03G 2221/1624* (2013.01)

(58) Field of Classification Search
CPC .. G03G 21/105; G03G 15/0891; G03G 21/12; G03G 2215/0827; G03G 15/0879; G03G 2221/1624
See application file for complete search history.

(56) References Cited

U.S. PATENT DOCUMENTS 6,266,511 B1 * 7/2001 Murakami ........... G03G 21/105 222/DIG. 1
11,500,307 B2 * 11/2022 Tsuji .................. G03G 15/0891
2003/0234262 A1 * 12/2003 Hart ..................... G03G 21/105 222/233
2008/0118290 A1 * 5/2008 Sato ..................... G03G 21/105 399/358
2009/0154972 A1 * 6/2009 Tanaka ................. G03G 21/105 399/358

(Continued)

FOREIGN PATENT DOCUMENTS

JP 9-197785 7/1997
JP 2010-156938 7/2010

(Continued)

*Primary Examiner* — Arlene Heredia
*Assistant Examiner* — Laura Roth
(74) *Attorney, Agent, or Firm* — XSENSUS LLP

(57) ABSTRACT

A toner conveying device includes a drop conveyance passage, an inclined conveyance passage, a conveyor, and a flexible sheet. Toner drops by its own weight through the drop conveyance passage. The inclined conveyance passage communicates with a lower end of the drop conveyance passage and extends obliquely downward. The conveyor has a coil shape or screw shape, is disposed in the inclined conveyance passage, and rotates in a specified direction to convey the toner obliquely downward. The flexible sheet is disposed in the drop conveyance passage, has a leading end to contact the conveyor, and swings in conjunction with rotation of the conveyor.

13 Claims, 6 Drawing Sheets

(56) References Cited

U.S. PATENT DOCUMENTS

2010/0143011 A1* 6/2010 Tawada ................ G03G 21/007 399/358
2011/0236075 A1* 9/2011 Suzuki ............... G03G 15/0893 399/262
2015/0050057 A1* 2/2015 Sato ..................... G03G 21/105 399/358
2015/0063887 A1* 3/2015 Asaoka ................ G03G 21/105 399/353
2017/0261887 A1 9/2017 Ishizuka et al.

FOREIGN PATENT DOCUMENTS

JP 2016194729 A * 11/2016
JP 2017-161616 9/2017
JP 2019-203956 11/2019

* cited by examiner

TONER CONVEYING DEVICE INCLUDING FLEXIBLE SHEET IN DROP CONVEYANCE PASSAGE AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2022-077450, filed on May 10, 2022, and 2023-017409, filed on Feb. 8, 2023, in the Japan Patent Office, the entire disclosure of which is hereby incorporated by reference herein.

BACKGROUND

Technical Field

Embodiments of the present disclosure generally relate to a developer conveying device to convey toner such as waste toner, recycle toner, or new toner, and an image forming apparatus, such as a copier, a printer, a facsimile machine, or a multifunction peripheral (MFP) having at least two of such capabilities, incorporating the developer conveying device.

Related Art

Image forming apparatuses, such as copiers or printers, are known that include a toner conveying device in which a drop conveyance passage to drop toner such as waste toner by its own weight is disposed.

SUMMARY

In an embodiment of the present disclosure, there is provided a toner conveying device that includes a drop conveyance passage, an inclined conveyance passage, a conveyor, and a flexible sheet. Toner drops by its own weight through the drop conveyance passage. The inclined conveyance passage communicates with a lower end of the drop conveyance passage and extends obliquely downward. The conveyor has a coil shape or screw shape, is disposed in the inclined conveyance passage, and rotates in a specified direction to convey the toner obliquely downward. The flexible sheet is disposed in the drop conveyance passage, has a leading end to contact the conveyor, and swings in conjunction with rotation of the conveyor.

In another embodiment of the present disclosure, there is provided an image forming apparatus that includes the toner conveying device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
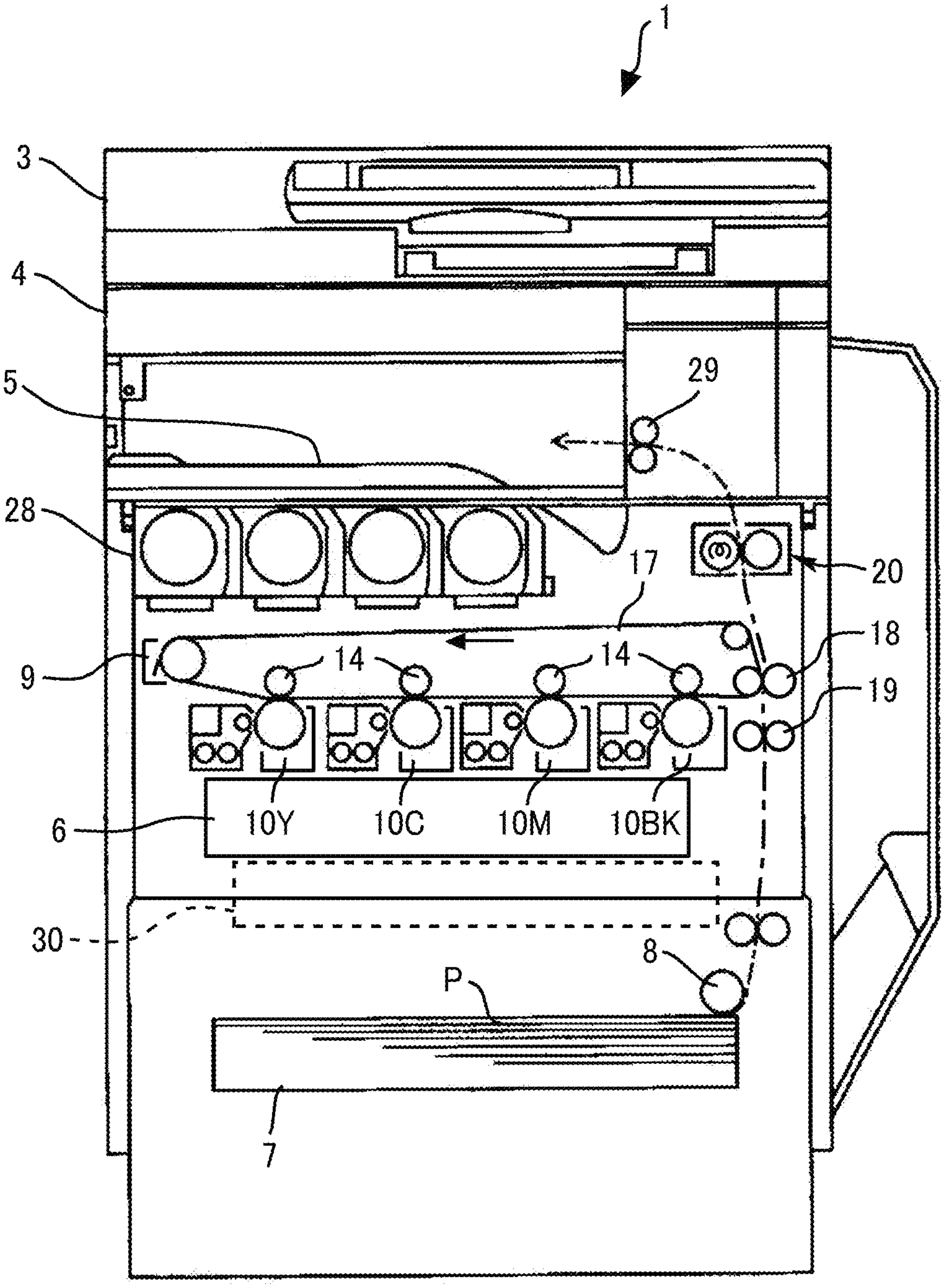
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to the drawings, embodiments of the present disclosure are described in detail below. Identical reference numerals are assigned to identical components or equivalents and descriptions of those components may be simplified or omitted.

First, with reference to FIG. 1, a description is given of an overall configuration and operation of an image forming apparatus 1, according to an embodiment of the present disclosure. In FIG. 1, the image forming apparatus 1, which is illustrated as a color copier in the present embodiment, includes a document conveying device 3, a scanner 4 (document reading device), and a writing device 6 (exposure device). The document conveying device 3 conveys documents to the scanner 4. The scanner 4 scans image data for the documents. The writing device 6 emits a laser beam based on input image data. The image forming apparatus 1 also includes a sheet feeder 7, process cartridges 10Y, 10M, 10C, and 10BK, an intermediate transfer belt 17 (an image bearer), and a secondary transfer roller 18. The sheet feeder 7 stores sheets P of paper or the like. The process cartridges 10Y, 10M, 10C, and 10BK are image forming devices to form yellow, magenta, cyan, and black toner images, respectively. The toner images of multiple colors are transferred and superimposed onto the intermediate transfer belt 17. The secondary transfer roller 18 transfers the toner images on the intermediate transfer belt 17 onto the sheet P. The image forming apparatus 1 further includes a fixing device 20, toner containers 28, and a waste-toner collection container 30. The fixing device 20 fixes unfixed toner images on the sheet P. The toner containers 28 contain toners of respective colors to be supplied to developing devices 13 of the corresponding process cartridges 10Y, 10M, 10C, and 10BK. Waste-toner is collected in the waste-toner collection container 30.

Figure 2:
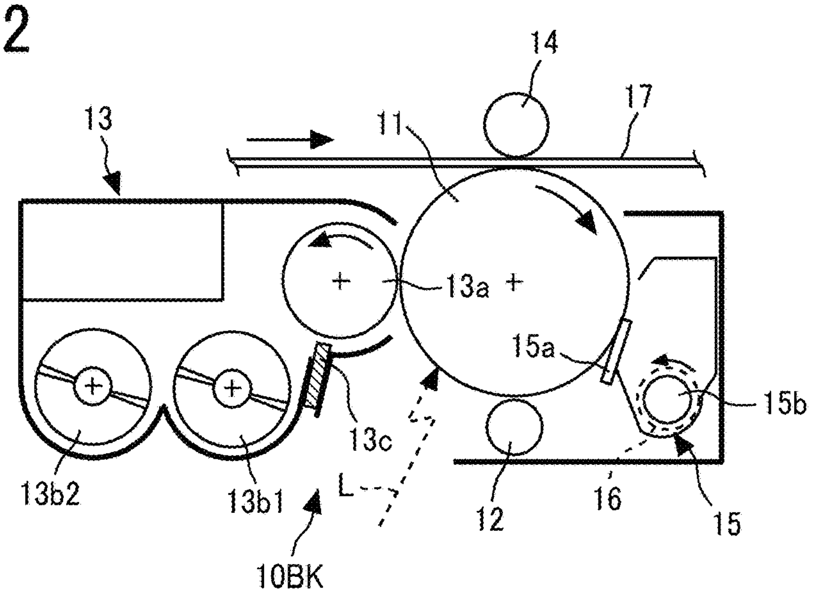
FIG. 2 is a schematic view of an image forming device of the image forming apparatus in FIG. 1.

Each of the process cartridges 10Y, 10M, 10C, and 10BK (serving as image forming devices) includes a photoconductor drum 11 (serving as an image bearer), a charging device 12, the developing device 13, and a cleaning device 15, which are integrated as a single unit as illustrated in FIG. 2. Each of the process cartridges 10Y, 10M, 10C, and 10BK, which is expendable, is replaced with a new one when depleted. Yellow, magenta, cyan, and black toner images are formed on the respective photoconductor drums 11 (serving as image bearers) in the process cartridges 10Y, 10M, 10C, and 10BK.

A description is given below of operations of the image forming apparatus 1 to form a normal color toner image. A conveying roller of the document conveying device 3 conveys a document on a document table onto an exposure glass of the scanner 4. The scanner 4 optically scans image data from the document on the exposure glass. The yellow, magenta, cyan, and black image data are transmitted to the writing device 6. The writing device 6 irradiates the photoconductor drums 11 of the corresponding process cartridges 10Y, 10M, 10C, and 10BK with laser beams L (exposure light) based on the yellow, magenta, cyan, and black image data, respectively.

Meanwhile, the four photoconductor drums 11 rotate clockwise as illustrated in FIGS. 1 and 2. With reference to FIG. 2, the charging device 12 (charging roller) uniformly charges a surface of the photoconductor drum 11 at a position opposite the photoconductor drum 11 (charging process). Thus, the surface of the photoconductor drum 11 is charged to a certain potential. Subsequently, the surface of the photoconductor drum 11 thus charged reaches a position where the surface of the photoconductor drum ibis irradiated with the laser beam L. The writing device 6 emits the laser beam L for respective colors from a light source according to the image data. The laser beams L are reflected by a polygon mirror and transmitted through multiple lenses. The transmitted laser beams L pass through different optical passages for the different color components of yellow, magenta, cyan, and black (exposure process).

The laser beam L corresponding to the yellow image data is emitted to the surface of the photoconductor drum 11 in the process cartridge 10Y, which is the first from the left in FIG. 1 among the four process cartridges 10Y, 10M, 10C, and 10BK. Thus, an electrostatic latent image for yellow is formed on the photoconductor drum 11 charged by the charging device 12 (charging roller). Similarly, the laser beam L corresponding to cyan image data is emitted to the surface of the photoconductor drum 11 in the second process cartridge 10C from the left in FIG. 1, thus forming an electrostatic latent image corresponding to the cyan image data on the surface of the photoconductor drum 11. The laser beam L corresponding to magenta image data is emitted to the surface of the photoconductor drum 11 in the third process cartridge 10M from the left in FIG. 1, thus forming an electrostatic latent image corresponding to the magenta image data on the surface of the photoconductor drum 11. The laser beam L corresponding to black image data is emitted to the surface of the photoconductor drum 11 in the fourth process cartridge 10BK from the left in FIG. 1, thus forming an electrostatic latent image corresponding to the black image data on the surface of the photoconductor drum 11.

Then, the surface of the photoconductor drum 11 having the electrostatic latent image reaches a position opposite the developing device 13 (see FIG. 2). The developing device 13 supplies toner of each color onto the surface of the photoconductor drum 11 and develops the electrostatic latent image on the photoconductor drum 11 into a toner image (development process). Subsequently, the surface of the photoconductor drum 11 after the development process reaches a position opposite the intermediate transfer belt 17 (intermediate transferor) as image bearer. Each of primary transfer rollers 14 is disposed at the position where the surface of the photoconductor drum 11 faces the intermediate transfer belt 17 such that the primary transfer roller 14 contacts an inner circumferential surface of the intermediate transfer belt 17. At the positions of the primary transfer rollers 14, the toner images on the photoconductor drums 11 are sequentially transferred to and superimposed on the intermediate transfer belt 17, forming a multicolor toner image thereon (primary transfer process).

After the primary transfer process, the surface of the photoconductor drum 11 reaches a position opposite the cleaning device 15 (see FIG. 2). The cleaning device 15 collects untransferred toner remaining on the photoconductor drum 11 (cleaning process). Then, the surface of the photoconductor drum 11 passes through a discharging device to complete a series of image forming processes performed on the photoconductor drum 11.

Meanwhile, the surface of the intermediate transfer belt 17, onto which the single-color toner images on the photoconductor drums 11 are transferred and superimposed, moves in a direction indicated by an arrow in FIG. 1 and reaches a position opposite a secondary transfer roller 18. The secondary transfer roller 18 secondarily transfers the multicolor toner image on the intermediate transfer belt 17 onto the sheet P (secondary transfer process). After the secondary transfer process, the surface of the intermediate transfer belt 17 reaches a position opposite an intermediate transfer belt cleaner 9 (cleaning device). The intermediate transfer belt cleaner 9 collects the untransferred toner on the intermediate transfer belt 17 to complete a series of transfer processes on the intermediate transfer belt 17.

The sheet P is conveyed from the sheet feeder 7 to the position of the secondary transfer roller 18, via a sheet conveyance guide, a registration roller pair 19, or the like. More specifically, a feed roller 8 feeds the sheet P from the sheet feeder 7 that stores a stack of sheets P, and the sheet P is then guided by the sheet conveyance guide to the registration roller pair 19. The sheet P that has reached the registration roller pair 19 is conveyed toward the position of the secondary transfer roller 18 so that the sheet P coincides with the arrival of the multicolor toner image on the intermediate transfer belt 17.

Subsequently, the sheet P, onto which the multicolor image is transferred, is conveyed to the fixing device 20. The fixing device 20 includes a fixing roller and a pressure roller pressing against each other. In a nip between the fixing roller and the pressure roller, the multicolor toner image is fixed on the sheet P. After the fixing process, an output roller pair 29 ejects the sheet P as an output image to the exterior of a body of the image forming apparatus 1, and the ejected sheets P are stacked on an output tray 5 to complete a series of image forming processes.

Next, with reference to FIG. 2, image forming devices of the image forming apparatus 1, according to an embodiment of the present disclosure are described in detail below. FIG. 2 is a schematic view of the process cartridge 10BK for black. Other three process cartridges 10Y, 10M, and 10C have a similar configuration to that of the process cartridge 10BK for black except for the color of toner used in the image forming process, and thus drawings and descriptions thereof are omitted to avoid redundancy.

As illustrated in FIG. 2, the process cartridge 10BK is a single unit that includes the photoconductor drum 11 as the image bearer, the charging device 12 to charge the photoconductor drum 11, the developing device 13 to develop the electrostatic latent image on the photoconductor drum 11, and the cleaning device 15 to remove the untransferred toner from the photoconductor drum 11 in a casing of the process cartridge 10BK.

The photoconductor drum 11 is an organic photoconductor designed to be charged with a negative polarity and includes a photosensitive layer formed on a drum-shaped conductive support. The charging device 12 is a charging roller including a conductive core and an elastic layer of moderate resistivity overlaid on the conductive core. A power supply applies a specified voltage to the charging device 12 (charging roller). Thus, the charging device 12 uniformly charges the surface of the photoconductor drum 11 facing the charging device 12.

The developing device 13 includes a developing roller 13*a* disposed opposite the photoconductor drum 11, a first conveying screw 13*b*1 disposed opposite the developing roller 13*a*, a second conveying screw 13*b*2 disposed opposite the first conveying screw 13*b*1 via a partition, and a doctor blade 13*c* disposed opposite the developing roller 13*a*. The developing roller 13*a* includes multiple magnets and a sleeve that rotates around the magnets. The magnets are stationary and generate magnetic poles around the circumferential surface of the developing roller 13*a*. The magnets generate a plurality of magnetic poles on the developing roller 13*a* (sleeve) to bear developer on the developing roller 13*a*. The developing device 13 stores two-component developer including carrier and toner.

The cleaning device 15 is provided with a cleaning blade 15*a* that contacts the photoconductor drum 11 and a conveying screw 15*b* (a conveyance tube 16) that conveys the untransferred toner collected in the cleaning device 15 toward a waste-toner conveying device 40 (see FIG. 3) as waste toner. For example, the cleaning blade 15*a* is made of rubber, such as urethane rubber, and contacts the surface of the photoconductor drum 11 at a specified angle with a specified pressure. With this configuration, substances such as the untransferred toner adhering to the photoconductor drum 11 are mechanically scraped off and collected in the cleaning device 15. The untransferred toner collected in the cleaning device 15 is conveyed to the waste-toner conveying device 40 (see FIG. 3) as the toner conveying device via the conveyance tube 16 in which the conveying screw 15*b* is disposed and conveyed to a waste-toner collection container 30 by the waste-toner conveying device 40. The conveyed untransferred toner is collected in the waste-toner collection container 30 as the waste toner. Similarly, with reference to FIG. 1, the intermediate transfer belt cleaner 9 as a cleaning device is also provided with a cleaning blade and a conveying screw. The cleaning blade contacts the intermediate transfer belt 17. The conveying screw (conveyance tube 16) conveys the untransferred toner collected in the intermediate transfer belt cleaner 9 toward the waste-toner conveying device 40 (see FIG. 3) as waste toner. The untransferred toner collected in the intermediate transfer belt cleaner 9 is conveyed to the waste-toner conveying device 40 (see FIG. 3) as the developer conveying device via the conveyance tube 16 in which a conveying screw is disposed, and conveyed to the waste-toner collection container 30 by the waste-toner conveying device 40. The conveyed untransferred toner is collected in the waste-toner collection container 30 as the waste toner. A description is given of the waste-toner conveying device 40 in further detail below. In addition to the untransferred toner, substances adhering to the photoconductor drum 11 or the intermediate transfer belt 17 include paper dust resulting from the sheet P, discharge products generated on the photoconductor drum 11 during discharge by the charging device 12, additives to the toner, and the like. In the present specification, such substances are collectively referred to as the "untransferred toner".

The image forming processes, described above, are described in further detail below with reference to FIG. 2. The developing roller 13*a* rotates in a direction (counterclockwise) indicated by an arrow in FIG. 2. In the developing device 13, as the first conveying screw 13*b*1 and the second conveying screw 13*b*2 arranged via the partition rotate, the developer is circulated in the longitudinal direction of the developing device 13, being stirred and mixed with toner supplied from the toner container 28 by a toner supply device. The longitudinal direction of the developing device 13 is perpendicular to the plane on which FIG. 2 is illustrated.

Thus, the toner is triboelectrically charged and attracted to the carrier. The toner is borne on the developing roller 13*a* together with the carrier. The developer borne on the developing roller 13*a* reaches a position opposite the doctor blade 13*c*. After having been adjusted to an appropriate amount at the position of the doctor blade 13*c*, the developer on the developing roller 13*a* then comes to an opposing position to the photoconductor drum 11 (i.e., a development area). In the development area, the toner in the developer adheres to the electrostatic latent image formed on the surface of the photoconductor drum 11. The toner adheres to the electrostatic latent image (i.e., the toner image is formed) by a development electric field formed by a potential difference (i.e., a developing potential) between a latent image potential (i.e., an exposure potential) of an image area irradiated with the laser beam L and a developing bias applied to the developing roller 13*a*. Subsequently, most of the toner attached to the photoconductor drum 11 in the developing process is transferred onto the intermediate transfer belt 17. The untransferred toner remained on the surface of the photoconductor drum 11 is collected in the cleaning device 15 by the cleaning blade 15*a*.

Figure 3:
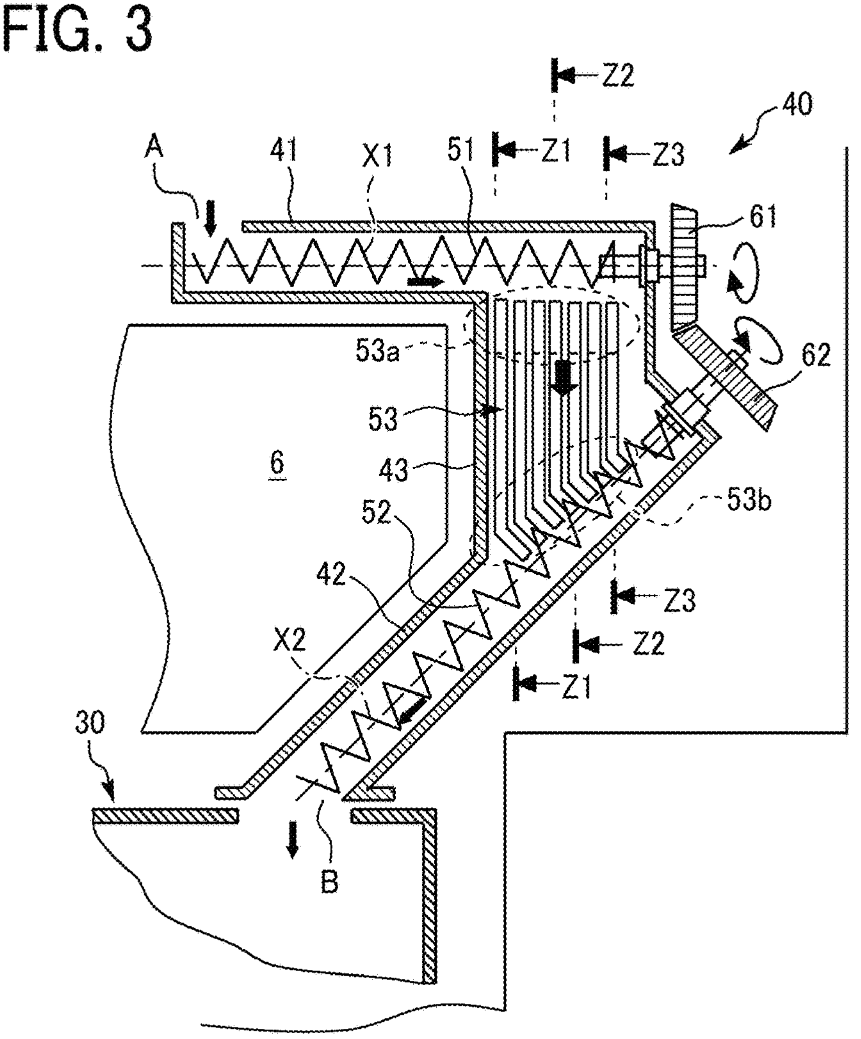
FIG. 3 is a cross-sectional view of a waste toner conveying device.

A detailed description is given below of the waste-toner conveying device 40 as the toner conveying device of the image forming apparatus 1 according to the present embodiment. With reference to FIG. 3, waste toner as the toner (developer) are collected by the plurality of cleaning devices 15 and the intermediate transfer belt cleaner 9 and flow into the waste-toner conveying device 40 from an inlet port A via the conveyance tube 16. The waste-toner conveying device 40 as the toner conveying device discharges the waste toner toward the waste-toner collection container 30 from an outlet port B. Specifically, the waste toner (toner) is conveyed in a direction indicated by a black arrow in FIG. 3 in the waste-toner conveying device 40. The waste-toner collection container 30 is detachably (replaceably) attached in the body of the image forming apparatus 1. When the waste-toner collection container 30 is attached to the body of the image forming apparatus 1, the waste-toner collection container 30 is communicatively coupled with the waste-toner conveying device 40 (an inclined conveyance passage 42). The waste toner that has been conveyed by the waste-toner conveying device 40 is collected in the waste-toner collection container 30.

As illustrated in FIGS. 3, 4A, 4B, and 4C, the waste-toner conveying device 40 (toner conveying device) is provided with a horizontal conveyance passage 41, a drop conveyance passage 43, and the inclined conveyance passage 42 along the conveyance direction of the waste toner indicated by a black arrow. The inlet port A is disposed at a top portion of the horizontal conveyance passage 41 on the upstream side of the horizontal conveyance passage 41 in the conveyance direction. The outlet port B is disposed at a bottom portion of the inclined conveyance passage 42 on the downstream side of the inclined conveyance passage 42 in the conveyance direction. Since there is a layout limitation in the body of the image forming apparatus 1, the waste-toner conveying device 40 is configured by combining a plurality of conveyance passages extending in different directions instead of a conveying passage directly connecting the inlet port A and the outlet port B. Specifically, in the present embodiment, as illustrated in FIG. 3, the horizontal conveyance passage 41, the drop conveyance passage 43, and the inclined conveyance passage 42 are disposed to avoid the writing device 6 located above the waste-toner collection container 30 in the image forming apparatus 1.

The drop conveyance passage 43, in which waste toner (toner) falls by its own weight, extends in a substantially vertical direction in the present embodiment. The drop conveyance passage 43 in the present embodiment is formed so that the horizontal cross section is rectangular. A flexible sheet 53 (see FIGS. 3, 4A, 4B, 4C, 5A, and 5B) for preventing cross-link of toner in the conveyance passage is disposed in the drop conveyance passage 43, which is described in detail below. In the present embodiment, the drop conveyance passage 43 extends in the substantially vertical direction. Alternatively, a drop conveyance passage can be used that has any shape allowing waste toner to fall by its own weight. For example, a drop conveyance passage can be used that allows toner to slide down on an inclined surface inclined relative to the vertical direction to fall by its own weight.

The inclined conveyance passage 42 communicates with a lower end (a portion surrounded by a broken line in FIG. 3) of the drop conveyance passage 43 and extends obliquely downward (a direction from the upper right to the lower left in FIG. 3). That is, the inclined conveyance passage 42 is disposed to intersect with the drop conveyance passage 43 at a specified inclination angle. In the present embodiment, the inclined conveyance passage 42 is substantially cylindrical.

Figure 6:
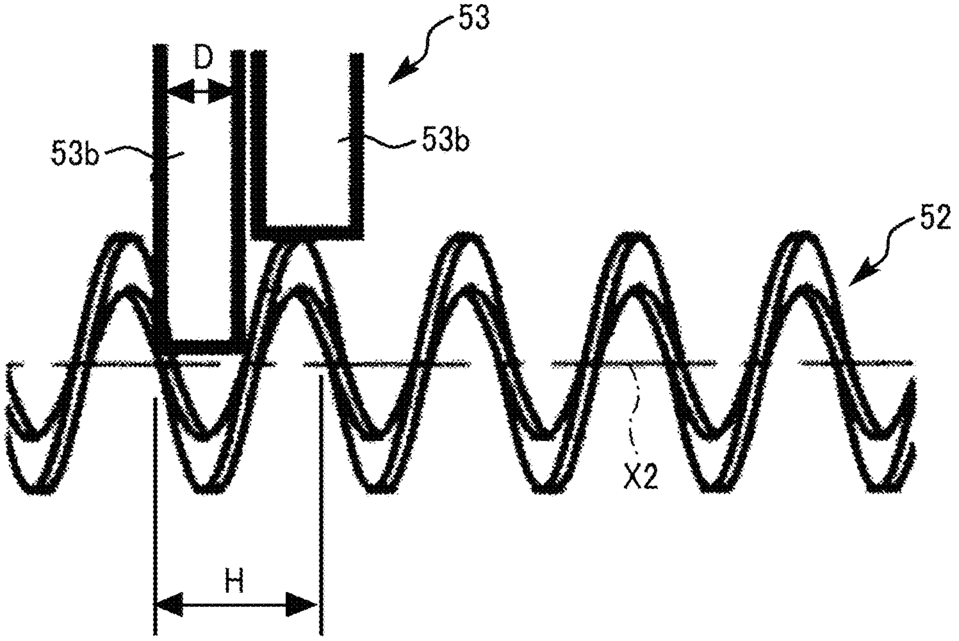
FIG. 6 is an enlarged view horizontally illustrating a conveying device disposed in an inclined conveyance passage and a leading end of a flexible sheet.

The inclined conveyance passage 42 is internally provided with an inclined conveying coil 52 as a coil-shaped conveyor (first conveyor) that rotates in a specified direction to convey waste toner (toner) obliquely downward. With reference to FIGS. 3 and 6, the inclined conveying coil 52 serving as a conveyor is made of a metal material. An upstream end (upper right end in FIG. 3) of a coil portion spirally wound in a specified direction is joined to a shaft of the inclined conveying coil 52 by welding. A bevel gear 62 is disposed on the shaft of the inclined conveying coil 52 by welding. The bevel gear 62 meshes with a bevel gear 61 of a horizontal conveying coil 51 to be described below and rotates the inclined conveying coil 52 in the direction indicated by the arrow in FIGS. 3, 4A, 4B, and 4C around a rotation center X2 with a rotational drive of the horizontal conveying coil 51 by a motor. Note that when the inclined conveying coil 52 rotates in the direction indicated by an arrow in FIGS. 4A, 4B, and 4C (counterclockwise direction), a flexible sheet 53 (53A to 53G) to be described below is raised in a direction away from projections 43*b* (43*b*1 to 43*b*3) by contact with the inclined conveying coil 52. Thus, the flexible sheet 53 (53A to 53G) to be described below swings efficiently.

On the other hand, the horizontal conveyance passage 41 communicates with an upper end of the drop conveyance passage 43 and extends in a horizontal direction (a direction from left to right in FIG. 3). That is, the horizontal conveyance passage 41 is disposed to intersect the drop conveyance passage 43 in the horizontal direction. In the present embodiment, the horizontal conveyance passage 41 is formed in a substantially cylindrical shape.

Next, the horizontal conveyance passage 41 is internally provided with the horizontal conveying coil 51 as a coil-shaped conveyor (second conveyor) that rotates in a specified direction and conveys waste toner (toner) in a horizontal direction. With reference to FIGS. 3 and 6, the horizontal conveying coil 51 serving as a second conveyor is made of a metal material. An upstream end (right end in FIG. 3) of a coil portion spirally wound in a specified direction is joined to a shaft of the horizontal conveying coil 51 by welding. The bevel gear 61 is disposed on the shaft of the horizontal conveying coil 51 by welding. The horizontal conveying coil 51 rotates in the direction indicated by the arrow in FIGS. 3, 4A, 4B, and 4C around a rotation center X1 by being driven by a motor. Note that as the horizontal conveying coil 51 rotates in the direction indicated by the arrow in FIGS. 4A, 4B, and 4C (clockwise direction), the waste toner conveyed by the horizontal conveying coil 51 in the horizontal conveyance passage 41 falls by its own weight along a side of the flexible sheet 53 (or an inner wall 43*a*) to be described below in the drop conveyance passage 43.

With reference to FIGS. 3, 4A, 4B, and 4C, the flexible sheet 53 is disposed in the drop conveyance passage 43 in the waste-toner conveying device 40 (toner conveying device) according to the present embodiment so that a leading end 53*b* of the flexible sheet 53 is contactable to the inclined conveying coil 52 (conveyor). As illustrated by a double-headed arrow in FIGS. 4A, 4B, and 4C, the flexible sheet 53 swings in conjunction with the rotation of the inclined conveying coil 52 (conveyor). That is, when the inclined conveying coil 52 rotates together with the horizontal conveying coil 51 with the operation of the waste-toner conveying device 40, the leading end 53*b* (lower end as a free end) of the flexible sheet 53 repeats contact and non-contact against the coil portion of the inclined conveying coil 52. Thus, the flexible sheet 53 swings. In particular, the leading end 53*b* of the flexible sheet 53 greatly swings at the communicating portion between the drop conveyance passage 43 and the inclined conveyance passage 42.

The waste-toner conveying device 40 is provided with the flexible sheet 53 as described above in the present embodiment. Even in a case where the inclined conveyance passage 42 extending obliquely downward is disposed to communicate with the lower end of the drop conveyance passage 43, or even if toner tends to condense in the vicinity of a portion where the drop conveyance passage 43 and the inclined conveyance passage 42 communicate with each other, the toner is scraped and crumbled by the flexible sheet 53. Thus, the cross-linking of toner is less likely to occur. Accordingly, toner conveyance failure due to occurrence of the toner cross-linking is less likely to occur. In particular, waste toner is more likely to cause the toner cross-linking than new toner (fresh toner). Thus, the configuration of the present embodiment is useful. As described above, since waste toner falls by its own weight along the flexible sheet 53 in the drop conveyance passage 43, the waste toner is likely to adhere to the flexible sheet 53. Since the flexible sheet 53 itself is actively swung, however, the adhesion of the toner to the flexible sheet 53 is less likely to occur. The flexible sheet 53 is a relatively inexpensive and lightweight member and repeats contact and non-contact with the inclined conveying coil 52 to swing without exclusively providing a drive source for swinging. Accordingly, the device has a relatively simple configuration.

In the present embodiment, the flexible sheet 53 is a sheet medium made of polyethylene terephthalate (PET) having a thickness of 0.05 to 0.2 mm. This is because, when the sheet thickness is less than 0.05 mm, the function of crumbling toner by swing of the flexible sheet 53 declines. When the sheet thickness exceeds 0.2 mm, a sound generated when the flexible sheet 53 is flipped by the inclined conveying coil 52 gets louder.

With reference to FIGS. 3, 4A, 4B, 4C, 5A, and 5B, in the present embodiment, the flexible sheet 53 (53A to 53G) extends in the vertically direction and an upper end 53*a* of the flexible sheet 53 is fixed as a fixed end to the inner wall 43*a* of the drop conveyance passage 43 such that the leading end 53*b* as a lower end of the flexible sheet 53 is a free end. Specifically, in the present embodiment, the upper end 53*a* of the flexible sheet 53 (53A to 53G) is bonded (cantilevered) to the inner wall 43*a* with a double-sided tape. As illustrated in FIG. 3, the inclined conveyance passage 42 extends obliquely downward at a specified inclination angle θ when viewed from a direction opposite the inner wall 43*a* of the drop conveyance passage 43.

Figures 4A, 4B, 4C:
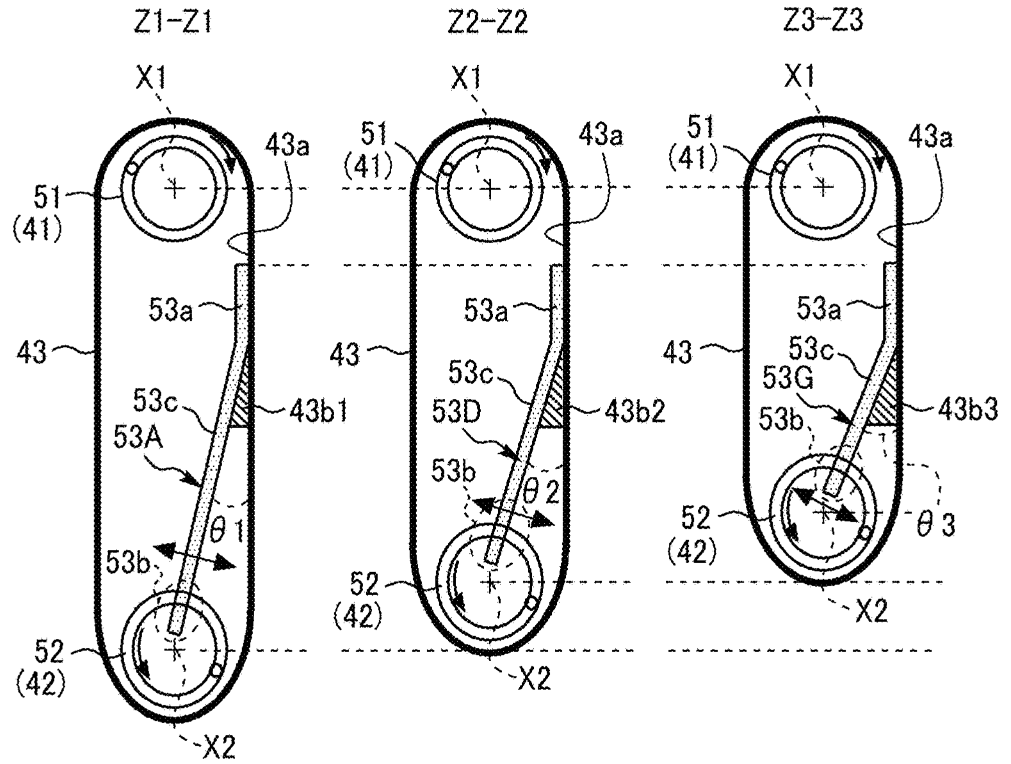
FIG. 4A is a cross-sectional diagram illustrating a Z1-Z1 cross section of the waste toner conveying device in FIG. 3.
FIG. 4B is a diagram illustrating a Z2-Z2 cross section of the waste toner conveying device in FIG. 3.
FIG. 4C is a diagram illustrating a Z3-Z3 cross section of the waste toner conveying device in FIG. 3.

In the present embodiment, as illustrated in FIGS. 4A, 4B, and 4C (and FIGS. 5A and 5B), a plurality of projections 43*b* (43*b*1 to 43*b*3) are disposed on the inner wall 43*a* of the drop conveyance passage 43. The projection 43*b* (43*b*1 to 43*b*3) inclines a portion except the upper end 53*a* downward in a direction away from the inner wall 43*a* such that the leading end 53*b* of the flexible sheet 53 (53A to 53G) faces the rotation center X2 of the inclined conveying coil 52 (conveyor). Specifically, as illustrated in FIGS. 4A, 4B, and 4C, the projection 43*b* (43*b*1 to 43*b*3) has an inclined surface formed to be inclined in a direction away from the inner wall 43*a* from the upper portion toward the bottom portion. Assuming that the flexible sheet 53 does not contact the inclined conveying coil 52 (or the inclined conveying coil 52 is not disposed), the flexible sheet 53 inclines along an inclined surface of the projection 43*b*. Thus, the leading end 53*b* of the flexible sheet 53 faces the rotation center X2 of the inclined conveying coil 52.

More specifically, as illustrated in FIGS. 4A, 4B, and 4C, the flexible sheet 53 (53A to 53G) is provided with the upper end 53*a*, a body portion 53*c*, and the leading end 53*b* (lower end). As illustrated in FIG. 3, the body portion 53*c* extends vertically downward from the upper end 53*a* when viewed from a direction facing the inner wall 43*a* as illustrated in FIG. 3. The body portion 53*c* extends obliquely downward left from the upper end 53*a* when viewed from a lateral side as in FIGS. 4A, 4B, and 4C. On the other hand, as illustrated in FIGS. 3, 5A, 5B and 6, the leading end 53*b* (lower end) is bent from a lower end of the body portion 53*c* to be substantially orthogonal to the rotation center X2 of the inclined conveying coil 52 (conveyor). That is, the leading end 53*b* intersects the rotation center X2 at substantially 90 degrees. With such a configuration, the leading end 53*b* of the flexible sheet 53 that extends downward is bent with respect to the inclined conveying coil 52 inclined obliquely, and the leading end 53*b* is contacted with the rotation center X2 in a manner such that the leading end 53*b* is directed straight toward the rotation center X2. Thus, the swing of the flexible sheet 53 interlocking with the rotation of the inclined conveying coil 52 is smoothly performed without causing a problem that the flexible sheet 53 rides up on the coil portion of the inclined conveying coil 52 in a twisted manner. Accordingly, an effect of preventing toner cross-linking is also efficiently performed.

Figures 5A, 5B:
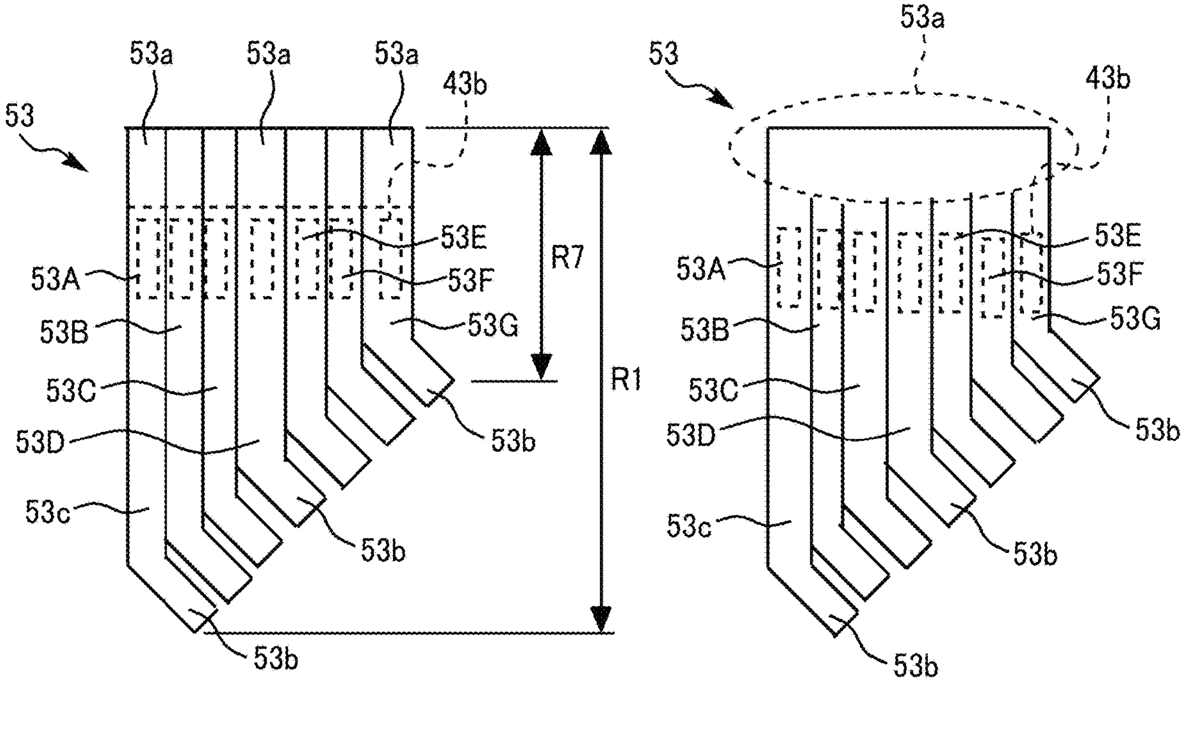
FIGS. 5A and 5B are front views of flexible sheets and positions at which projections contact the flexible sheets.

As illustrated in FIGS. 3, 4A, 4B, 4C, 5A, and 5B, the flexible sheet 53 is provided with a plurality of flexible sheets 53A to 53G (seven flexible sheets in the present embodiment) such that the plurality of leading ends 53*b* (seven leading ends 53*b* in the present embodiment) are aligned along the conveyance direction (obliquely downward in FIG. 3) of the inclined conveying coil 52. The upper ends 53*a* of the plurality of flexible sheets 53A to 53G are bonded to the inner wall 43*a* at the same height position (adjacent to the connecting portion between the horizontal conveyance passage 41 and the drop conveyance passage 43). With reference to FIGS. 5A and 5B, a plurality of projections 43*b* are arranged to correspond to the plurality of flexible sheets 53A to 53G.

Specifically, with reference to FIGS. 3, 5A, and 5B, the plurality of flexible sheets 53A to 53G are configured such that a sheet length (a length from a fixed end to a free end) of a sheet located at a position corresponding to the upstream side in the conveyance direction (a direction from obliquely upper right to obliquely lower left in FIG. 3) is shorter than a sheet length of a sheet located at a position corresponding to a downstream side in the conveyance direction (R1>R7). More particularly, with reference to FIGS. 5A and 5B, the sheet length is shorter in the order of the first flexible sheet 53A, the second flexible sheet 53B, the third flexible sheet 53C, the fourth flexible sheet 53D, the fifth flexible sheet 53E, the sixth flexible sheet 53F, and the seventh flexible sheet 53G.

The plurality of projections 43*b* are configured such that the projection height (a height of a lower portion thereof and a height in a direction away from the inner wall 43*a*) of a sheet located at a position corresponding to an upstream side in the conveyance direction (a direction from obliquely upper right toward obliquely lower left in FIG. 3) is higher than the projection height of a sheet located at a position corresponding to a downstream side in the conveyance direction. Specifically, with reference to FIGS. 4A, 4B, and 4C, the projection height of the downstream projection 43*b* illustrated in FIG. 4A is lower than the projection height of the midstream projection 43*b* illustrated in FIG. 4B. The projection height of the midstream projection 43*b* illustrated in FIG. 4B is lower than the projection height of the upstream projection 43*b* illustrated in FIG. 4C. As a result, an inclination angle θ1 of the flexible sheet 53A on the downstream side illustrated in FIG. 4A is smaller than an inclination angle θ2 of the flexible sheet 53D on the midstream side illustrated in FIG. 4B. The inclination angle θ2 of the flexible sheet 53D on the midstream side illustrated in FIG. 4B is smaller than an inclination angle θ3 of the flexible sheet 53G on the upstream side illustrated in FIG.

4C (θ1<θ2<θ3). Note that the above-described inclination angles θ1 to θ3 are angles formed by an inner wall 43*a* of the drop conveyance passage 43 and the body portion 53*c* of the flexible sheets 53A, 53D, and 53G when viewed in a cross section orthogonal to the rotation axis of the horizontal conveying coil 51. With such a configuration, the plurality of flexible sheets 53A to 53G in which the upper ends 53*a* are fixed at the same height position and having different lengths uniformly head to the rotation center X2 of the inclined conveying coil 52. Accordingly, the plurality of flexible sheets 53A to 53G smoothly swing in conjunction with rotation of the inclined conveying coil 52. Thus, toner cross-linking is efficiently reduced.

Note that in the present embodiment, as illustrated in FIG. 5B, the plurality of flexible sheets 53A to 53G can be integrally formed with each other such that the upper ends 53*a* thereof are positioned at the same height positions. That is, the flexible sheet 53 can be formed into a comb shape as a single member so that the portion other than the upper end 53*a* is constituted of the flexible sheets 53A to 53G divided into a plurality of portions. When the flexible sheet 53 is formed into a comb shape as described above, the number of components can be reduced, and assemblability in an apparatus can be improved, as compared with a case where each of the plurality of flexible sheets 53A to 53G is formed as an independent component as illustrated in FIG. 5A. Note that the number of the plurality of flexible sheets 53A to 53G and the plurality of projections 43*b* is seven in the present embodiment. The number of flexible sheets is not limited thereto.

As illustrated in FIG. 6, in the present embodiment, a sheet width D of the leading end 53*b* of the flexible sheet 53 (53A to 53G) is formed to be smaller than a coil pitch H of the inclined conveying coil 52 (conveyor) (D<H). With such a configuration, the swing of the flexible sheet 53 in conjunction with the rotation of the inclined conveying coil 52 is smoothly performed without occurrence of a failure that the flexible sheet 53 rides up on the coil portion of the inclined conveying coil 52 in a twisted state. Accordingly, an effect of preventing toner cross-linking is also efficiently performed.

First Modification

Figure 7:
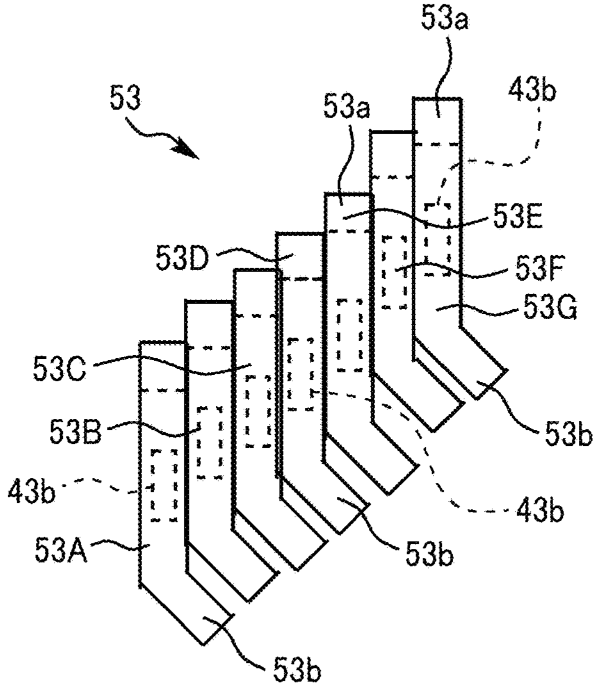
FIG. 7 is a front view of flexible sheets as a first modification.

As illustrated in FIG. 7, the flexible sheet according to a first modification is formed such that the positions of upper ends 53*a* of a plurality of flexible sheets 53A to 53G are not at the same height position and that a flexible sheet (a flexible sheet on right side in FIG. 7) on an upstream side is positioned higher than a flexible sheet (a flexible sheet on left side in FIG. 7) on a downstream side. With such a configuration, the sheet lengths of the plurality of flexible sheets 53A to 53G are set to be equal to each other. The flexible sheets 53A to 53G can be formed as the same component (components can be commonized). The plurality of projections 43*b* (for inclining the central portions of the plurality of flexible sheets 53A to 53G downward in a direction away from the inner wall 43*a*) formed in the drop conveyance passage 43 (inner wall 43*a*) are formed at the same projection height to contact the flexible sheets 53A to 53G at the same positions (so that the distances from the upper ends 53*a* to the contact positions are equal). Accordingly, the plurality of projections 43*b* are arranged in a step shape such that height positions are shifted in accordance with the plurality of flexible sheets 53A to 53G arranged in a step shape on the inner wall 43*a* of the drop conveyance passage 43. Even in a case of such a configuration, a portion in which toner cross-linking is likely to occur in the drop conveyance passage 43 is a lower portion surrounded by a broken line in FIG. 3. Thus, an effect of preventing toner cross-linking is sufficiently performed. Note that also in the first modification, as described above with reference to FIG. 5B, the flexible sheet 53 can be formed as one component in a comb shape.

Second Modification

Figures 8A, 8B:
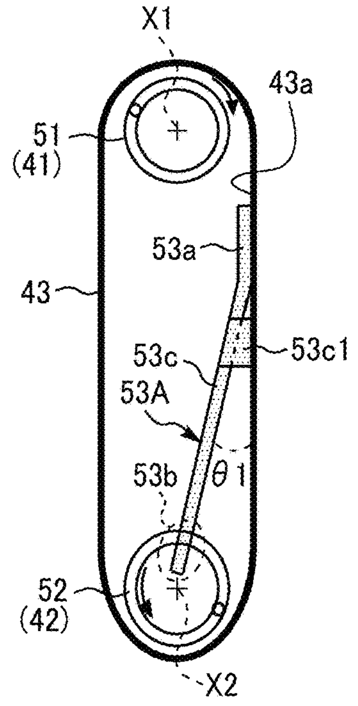
FIGS. 8A and 8B are cross-sectional views of a waste toner conveying device as a second modification.

As illustrated in FIG. 8A, in a second modification, a projection 53*c*1 for causing the leading end 53*b* of the flexible sheet 53 (53A) to face the rotation center X2 of the inclined conveying coil 52 is formed on the body portion 53*c* of the flexible sheet 53 by bending. Also in a case of such a configuration, when the inclined conveying coil 52 rotates together with the horizontal conveying coil 51 along with operation of the waste-toner conveying device 40, the flexible sheet 53 swings while the leading end 53*b* of the flexible sheet 53 repeats contact and non-contact with the coil portion of the inclined conveying coil 52. Accordingly, the toner cross-linking does not easily occur at the connecting portion between the drop conveyance passage 43 and the inclined conveyance passage 42. Note that the flexible sheet 53 is provided with the projection 53*c*1 in the second modification. The flexible sheet 53 and the inner wall 43*a* may be provided with projections. With reference to FIG. 8B, in a case where the flexible sheet 53 (53A) is bent and the inclination angle θ1 toward the rotation center X2 can be sufficiently maintained, arrangement of the projections on the flexible sheet 53 and the inner wall 43*a* may be omitted.

Third Modification

Figures 9A, 9B, 9C:
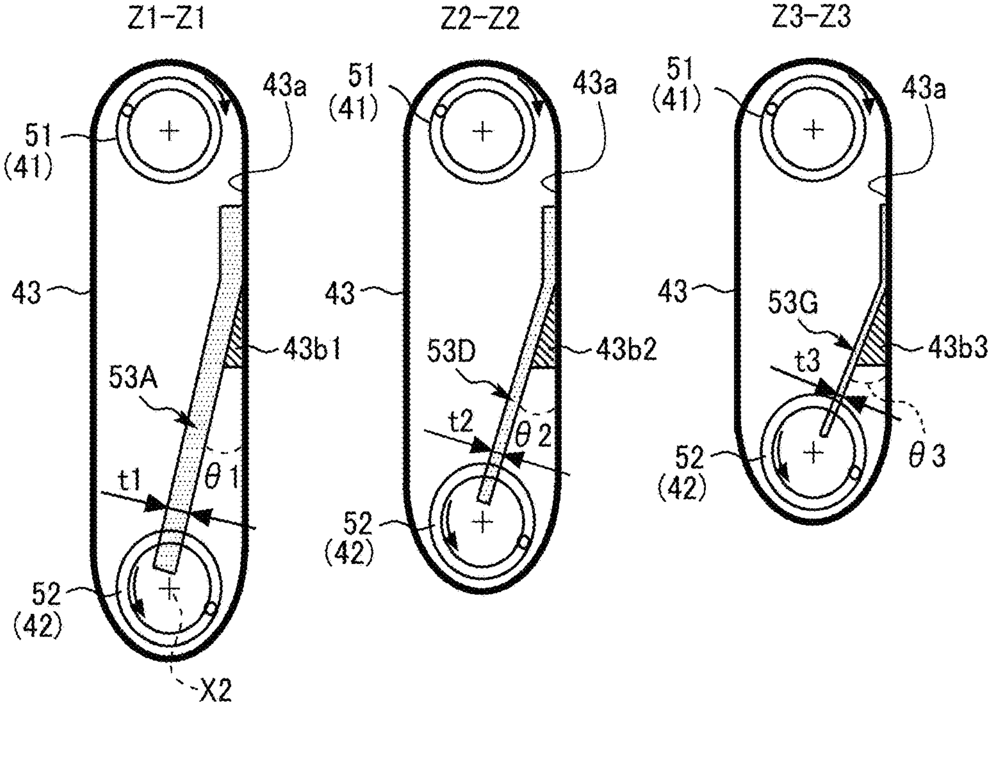
FIG. 9A is a cross-sectional diagram illustrating a Z1-Z1 cross section of the waste toner conveying device as a third modification.
FIG. 9B is a diagram illustrating a Z2-Z2 cross section of the waste toner conveying device as the third modification.
FIG. 9C is a diagram illustrating a Z3-Z3 cross section of the waste toner conveying device as the third modification.

The plurality of flexible sheets 53A to 53G in a third modification are configured such that at least the repulsive forces (elastic forces) of the plurality of flexible sheets 53A to 53G against an external force of the same magnitude are substantially the same. Preferably, the plurality of flexible sheets 53A to 53G are configured such that the repulsive force (elastic force) against an external force of the same magnitude is smaller in a flexible sheet located at a position corresponding to an upstream side of an obliquely lower portion than in a flexible sheet located at a position corresponding to a downstream side of the obliquely lower portion. Specifically, as illustrated in FIGS. 9A, 9B, and 9C, the plurality of flexible sheets 53A to 53G are configured such that a flexible sheet positioned at a position corresponding to an upstream side in the conveyance direction (which is a direction from obliquely upper right to obliquely lower left in FIGS. 9A, 9B, and 9C) is thinner than a flexible sheet positioned at a position corresponding to a downstream side in the conveyance direction. More specifically, a sheet thickness t1 of the flexible sheet 53A on the downstream side illustrated in FIG. 9A is smaller than a sheet thickness t2 of the flexible sheet 53D on the midstream side illustrated in FIG. 9B. The sheet thickness t2 of the flexible sheet 53D on the midstream side illustrated in FIG. 9B is smaller than a sheet thickness t3 of the flexible sheet 53G on the upstream side illustrated in FIG. 9C (t1>t2>t3). The reason for configuring as such is as follow. The flexible sheet 53A on the downstream side is longer than the flexible sheet 53G on the upstream side. Accordingly, in a case where the sheet thicknesses are made equal, the repulsive force when the flexible sheet 53A on the downstream side is repelled by the inclined conveying coil 52 is smaller, and there is a possibility that the performance of preventing toner cross-linking decreases. At a connecting portion between the drop conveyance passage 43 and the inclined conveyance passage 42, toner cross-linking may occur more easily on an obliquely lower downstream side than an obliquely upper upstream side. The above-described configuration of the third modification can prevent toner cross-linking from occurring over the entire area of the connecting portion between the drop conveyance passage 43 and the inclined conveyance passage 42. Note that in the third modification, the sheet thicknesses t1 and t3 of the plurality of flexible sheets 53 are different so that the repulsive forces (elastic forces) of the plurality of flexible sheets 53 are substantially equal to each other (or so that the repulsive forces are different). On the other hand, the material, the sheet width, or the sheet length may be difference among the plurality of flexible sheets 53 so that the repulsive forces (elastic forces) of the plurality of flexible sheets 53 are substantially equal (or the repulsive forces are different).

Fourth Modification

Figure 10A:
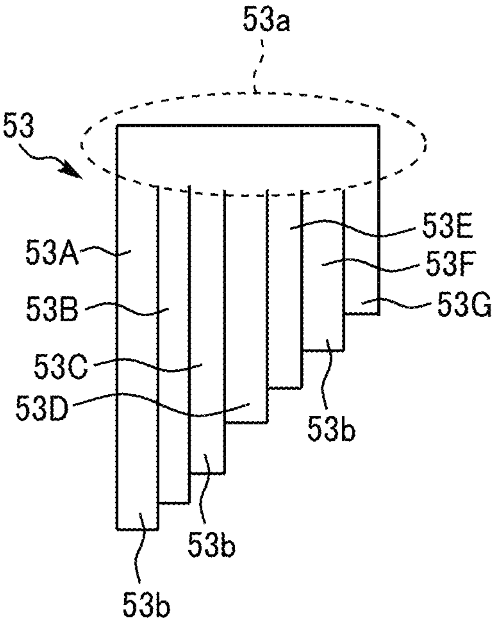
FIGS. 10A and 10B are front views of flexible sheets as a fourth modification.
Figure 10B:
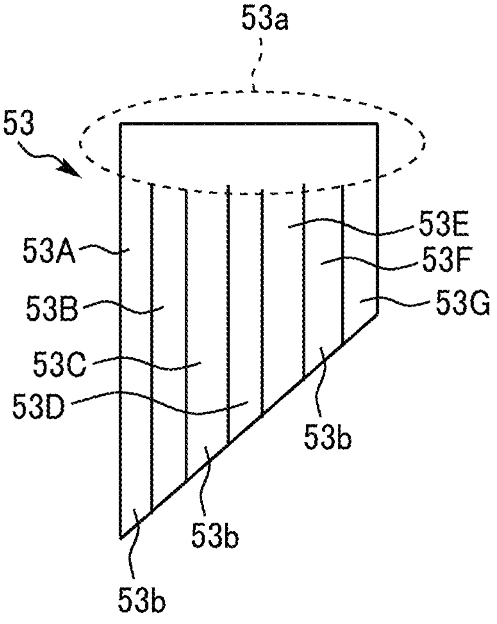

As illustrated in FIG. 10A, in the flexible sheet 53 (53A to 53G) according to the fourth modification, the leading end 53*b* is formed in a straight shape from the body portion 53*c* without being bent. In the flexible sheet 53 (53A to 53G) illustrated in FIG. 10B, the leading end 53*b* having a straight shape is provided with a taper to extend along the rotation center X2 of the inclined conveying coil 52 (the leading end 53*b* is diagonally cut). As described above with reference to FIGS. 5A and 5B, such a configuration may cause a failure that the flexible sheet 53 rides up on the coil portion in a twisted state when the flexible sheet 53 swings in conjunction with rotation of the inclined conveying coil 52, as compared with the flexible sheet 53 in which the leading end 53*b* is formed to be bent from the body portion 53*c*. However, the flexible sheet 53 swings as it is so that toner cross-linking is reduced to some extent.

Fifth Modification

Figure 11:
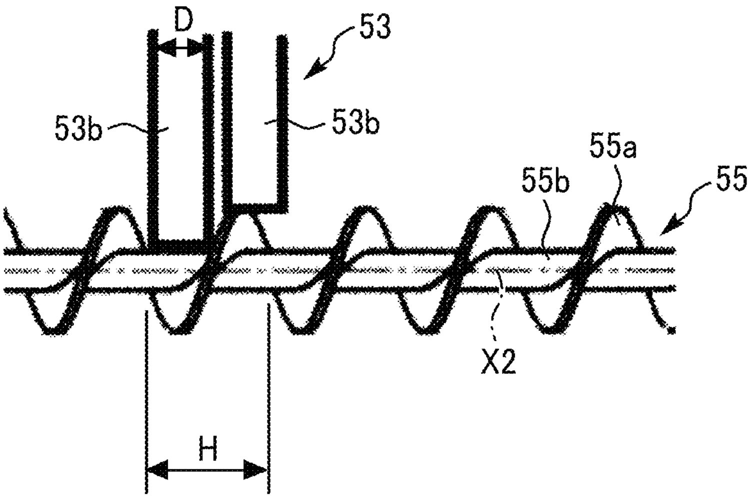
FIG. 11 is an enlarged view horizontally illustrating a conveying device disposed in an inclined conveyance passage and a leading end of a flexible sheet as a fifth modification.

As illustrated in FIG. 11, in a fifth modification, an inclined conveying screw 55 (a screw-shaped conveyor) is disposed in the inclined conveyance passage 42 instead of the inclined conveying coil 52 (the coil-shaped conveyor). Specifically, in the inclined conveying screw 55, a screw portion 55*a* is spirally wound around a shaft 55*b* extending in the rotation axis direction over substantially the entire area of the inclined conveyance passage 42. The sheet width D of the leading end 53*b* of the flexible sheet 53 is smaller than a screw pitch H of the inclined conveying screw 55 (D<H). Even in the waste-toner conveying device 40 in which the inclined conveying screw 55 is disposed as described above, the flexible sheet 53 that swings in conjunction with rotation of the inclined conveying screw 55 can prevent toner from causing cross-linking at the connecting portion between the drop conveyance passage 43 and the inclined conveyance passage 42. Note that a horizontal conveying screw (screw-shaped second conveyor) may be disposed instead of the horizontal conveying coil 51 (coil-shaped second conveyor) in the horizontal conveyance passage 41.

As described above, the waste-toner conveying device 40 (toner conveyor) according to the present embodiment includes the drop conveyance passage 43, the inclined conveyance passage 42, and a coiled or screw-shaped conveyor (inclined conveying coil 52). Toner drops by its own weight through the drop conveyance passage 43. The inclined conveyance passage 42 communicates with a lower end of the drop conveyance passage 43 and extends obliquely downward. The coiled or screw-shaped conveyor (inclined conveying coil 52) is disposed in the inclined conveyance passage 42 and rotates in a specified direction to convey toner obliquely downward. The flexible sheet 53 that swings in conjunction with rotation of the conveyor (inclined conveying coil 52) is disposed in the drop conveyance passage 43 so that the leading end 53*b* of the flexible sheet 53 is contactable with the conveyor (inclined conveying coil 52). As a result, even in a case where the inclined conveyance passage 42 extending obliquely downward is disposed to communicate with the lower end of the drop conveyance passage 43, the cross-linking of the toner is less likely to occur.

In the above-described embodiments, the present disclosure is applied to the waste-toner conveying device 40 (toner conveying device) in which the untransferred toner collected by the cleaning device 15 or the intermediate transfer belt cleaner 9 is conveyed as waste toner toward the waste-toner collection container 30. However, the present disclosure is not limited to the above-described embodiments, and can readily be applied to, for example, a waste-toner conveying device in which only untransferred toner collected in the cleaning device 15 for the photoconductor drum 11 is conveyed as waste toner toward the waste-toner collection container 30. In the above-described embodiments, the present disclosure is applied to the waste-toner conveying device 40 (toner conveying device) in which waste toner as toner is conveyed. However, the present disclosure is not limited to the above-described embodiments, and can readily be applied to, for example, a toner conveying device in which the untransferred toner collected by the cleaning device 15 is conveyed as recycle toner toward the developing device 13, a toner conveying device in which fresh toner or two-component developer is conveyed toward the developing device 13, or the like. Although the present disclosure is applied to the waste-toner conveying device 40 (toner conveying device) provided with the horizontal conveyance passage 41 in the present embodiment, the present disclosure can also be applied to a toner conveying device including the drop conveyance passage 43 and the inclined conveyance passage 42 without the horizontal conveyance passage 41, a toner conveying device provided with another conveyance passage (e.g., an inclined conveyance passage) instead of the horizontal conveyance passage 41. Such cases also provide substantially the same effects as the effects described above.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, the number, position, shape, and so forth of components are not limited to those of the present embodiment and variations, and may be the number, position, shape, and so forth that are suitable for implementing the present disclosure.

Note that aspects of the present disclosure may be applicable to, for example, combinations of first to twelfth aspects as follows.

First Aspect

In a first aspect, a toner conveying device (e.g., the waste-toner conveying device 40) includes a drop conveyance passage (e.g., the drop conveyance passage 43), an inclined conveyance passage (e.g., the inclined conveyance passage 42), a conveyor (e.g., the inclined conveying coil 52), and a flexible sheet (e.g., the flexible sheet 53). Toner drops by its own weight through the drop conveyance passage (e.g., the drop conveyance passage 43). The inclined conveyance passage (e.g., the inclined conveyance passage 42) communicates with a lower end of the dropped conveyance passage (e.g., the drop conveyance passage 43) and extends obliquely downward. The conveyor (e.g., the inclined conveying coil 52) has a coil shape or screw shape and is disposed in the inclined conveyance passage (e.g., the inclined conveyance passage 42), and rotates in a specified direction to convey the toner obliquely downward. The flexible sheet (e.g., the flexible sheet 53) is disposed in the drop conveyance passage (e.g., the drop conveyance passage 43) and has a leading end (e.g., the leading end 53*b*) to contact the conveyor (e.g., the inclined conveying coil 52). The flexible sheet (e.g., the flexible sheet 53) swings in conjunction with rotation of the conveyor (e.g., the inclined conveying coil 52).

Second Aspect

In a second aspect, in the toner conveying device (e.g., the waste-toner conveying device 40) according to the first aspect, the flexible sheet (e.g., the flexible sheet 53) extends in a vertical direction and an upper end (e.g., the upper end 53*a*) of the flexible sheet (e.g., the flexible sheet 53) is fixed as a fixed end to an inner wall (e.g., the inner wall 43*a*) of the drop conveyance passage (e.g., the drop conveyance passage 43) such that the leading end (e.g., the leading end 53*b*) as a lower end of the flexible sheet (e.g., the flexible sheet 53) is a free end. At least one of the inner wall (e.g., the inner wall 43*a*) and the flexible sheet (e.g., the flexible sheet 53) has a projection (e.g., the projection 43*b*) to incline a portion of the flexible sheet (e.g., the flexible sheet 53) except the upper end (e.g., the upper end 53*a*) in a direction away from the inner wall (e.g., the inner wall 43*a*) such that the leading end (e.g., the leading end 53*b*) of the flexible sheet (e.g., the flexible sheet 53) faces a rotation center (e.g., the rotation center X2) of the conveyor (e.g., the inclined conveying coil 52).

Third Aspect

In a third aspect, in the toner conveying device (e.g., the waste-toner conveying device 40) according to the second aspect, the flexible sheet (e.g., the flexible sheet 53) includes the upper end (e.g., the upper end 53*a*), a body portion (e.g., the body portion 53*c*), and the leading end (e.g., the leading end 53*b*). The body portion (e.g., the body portion 53*c*) extends vertically downward from the upper end (e.g., the upper end 53*a*). The leading end (e.g., the leading end 53*b*) is bent from a lower end of the body portion (e.g., the body portion 53*c*) to be substantially orthogonal to the rotation center (e.g., the rotation center X2) of the conveyor (e.g., the inclined conveying coil 52).

Fourth Aspect

In a fourth aspect, in the toner conveying device (e.g., the waste-toner conveying device 40) according to the second or third aspect, a plurality of flexible sheets (e.g., the flexible sheets 53A to 53G) including the flexible sheet (e.g., the flexible sheet 53) are disposed such that a plurality of leading ends (e.g., the leading ends 53*b*) of the plurality of flexible sheets (e.g., the flexible sheets 53A to 53G) are aligned along a conveyance direction of the conveyor (e.g., the inclined conveying coil 52). The toner conveying device (e.g., the waste-toner conveying device 40) includes a plurality of projections (e.g., the projections 43*b*1 to 43*b*3) including the projection (e.g., the projection 43*b*) corresponding to the plurality of flexible sheets (e.g., the flexible sheets 53A to 53G). In the plurality of projections (e.g., the projections 43*b*1 to 43*b*3), a height of a projection (e.g., the projection 43*b*3) positioned at a position corresponding to an upstream side in the conveyance direction is higher than a height of a projection (e.g., the projection 43*b*1) positioned at a position corresponding to a downstream side in the conveyance direction.

Fifth Aspect

In a fifth aspect, in the toner conveying device (e.g., the waste-toner conveying device 40) according to any one of the first to fourth aspects, a sheet width (e.g., the sheet width D) of the leading end (e.g., the leading end 53*b*) of the flexible sheet (e.g., the flexible sheet 53) is smaller than a coil pitch (e.g., the coil pitch H) or a screw pitch (e.g., the screw pitch H) of the conveyor (e.g., the inclined conveying coil 52).

Sixth Aspect

In a sixth aspect, in the toner conveying device (e.g., the waste-toner conveying device 40) according to any one of the first to third aspects, a plurality of flexible sheets (e.g., the flexible sheets 53A to 53G) including the flexible sheet (e.g., the flexible sheet 53) are disposed such that a plurality of leading ends (e.g., the leading ends 53*b*) of the plurality of flexible sheets (e.g., the flexible sheets 53A to 53G) are aligned along the conveyance direction of the conveyor (e.g., the inclined conveying coil 52).

Seventh Aspect

In a seventh aspect, in the toner conveying device (e.g., the waste-toner conveying device 40) according to the sixth aspect, the plurality of flexible sheets (e.g., the flexible sheets 53A to 53G) are disposed such that upper ends (e.g., the upper end 53*a*) of the plurality of flexible sheets (e.g., the flexible sheets 53A to 53G) are unified as a single portion.

Eighth Aspect

In an eighth aspect, in the toner conveying device (e.g., the waste-toner conveying device 40) according to the sixth or seventh aspect, the plurality of flexible sheets (e.g., the flexible sheets 53A to 53G) are disposed such that a length of a flexible sheet (e.g., the flexible sheet 53A) positioned at a position corresponding to an upstream side in the conveyance direction is shorter than a length of a flexible sheet (e.g., the flexible sheet 53G) positioned at a position corresponding to a downstream side in the conveyance direction.

Ninth Aspect

In a ninth aspect, in the toner conveyance device (e.g., the waste-toner conveying device 40) according to any one of the sixth to eighth aspects, the plurality of flexible sheets (e.g., the flexible sheets 53A to 53G) are disposed such that a flexible sheet (e.g., the flexible sheet 53A) positioned at a position corresponding to an upstream side in the conveyance direction is thinner than a flexible sheet (e.g., the flexible sheet 53G) positioned at a position corresponding to a downstream side in the conveyance direction.

Tenth Aspect

In a tenth aspect, in the toner conveying device (e.g., the waste-toner conveying device 40) according to the first to ninth aspects, the flexible sheet (e.g., the flexible sheet 53) has a sheet thickness of 0.05 to 0.2 mm.

Eleventh Aspect

In an eleventh aspect, the toner conveying device (e.g., the waste-toner conveying device 40) according to the first to tenth aspects further includes a horizontal conveyance passage (e.g., the horizontal conveyance passage 41) and a second conveyor (e.g., the horizontal conveying coil 51). The horizontal conveyance passage (e.g., the horizontal conveyance passage 41) communicates with an upper end of the drop conveyance passage (e.g., the drop conveyance passage 43) and extends in a horizontal direction. The second conveyor (e.g., the horizontal conveying coil 51) has a coil shape or screw shape and is disposed in the horizontal conveyance passage (e.g., the horizontal conveyance passage 41), and rotates in a specified direction to convey the toner in the horizontal direction.

Twelfth Aspect

In a twelfth aspect, an image forming apparatus (e.g., the image forming apparatus 1) includes the toner conveying device (e.g., the waste-toner conveying device 40) according to any one of the first to eleventh aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A toner conveying device comprising:
a drop conveyance passage through which toner drops by its own weight;
an inclined conveyance passage communicating with a lower end of the drop conveyance passage and extending obliquely downward;
a conveyor having a coil shape or screw shape and disposed in the inclined conveyance passage, the conveyor configured to rotate in a specified direction to convey the toner obliquely downward; and
a flexible sheet disposed in the drop conveyance passage and having a leading end to contact the conveyor, the flexible sheet configured to swing in conjunction with rotation of the conveyor,
wherein the toner conveying device further comprises a plurality of flexible sheets including the flexible sheet disposed such that a plurality of leading ends of the plurality of flexible sheets are aligned along the conveyance direction of the conveyor.

2. The toner conveying device according to claim 1,
wherein the flexible sheet extends in a vertical direction and an upper end of the flexible sheet is fixed as a fixed end to an inner wall of the drop conveyance passage such that the leading end as a lower end of the flexible sheet is a free end, and
wherein at least one of the inner wall or the flexible sheet has a projection to incline a portion of the flexible sheet except the upper end in a direction away from the inner wall such that the leading end of the flexible sheet faces a rotation center of the conveyor.

3. The toner conveying device according to claim 2,
wherein the flexible sheet includes:
the upper end;
a body portion extending vertically downward from the upper end; and
the leading end bent from a lower end of the body portion so that an extension direction from the lower end of the body portion to a free end of the leading end is orthogonal to an axial line of a screw of the conveyor.

4. The toner conveying device according to claim 2, further comprising:
a plurality of projections including the projection corresponding to the plurality of flexible sheets,
wherein in the plurality of projections, a height of a projection positioned at a position corresponding to an upstream side in the conveyance direction is higher than a height of a projection positioned at a position corresponding to a downstream side in the conveyance direction.

5. The toner conveying device according to claim 1,
wherein a sheet width of the leading end of the flexible sheet is smaller than a coil pitch or a screw pitch of the conveyor.

6. The toner conveying device according to claim 1,
wherein upper ends of the plurality of flexible sheets are unified as a single portion.

7. The toner conveying device according to claim 1,
wherein in the plurality of flexible sheets, a length of a flexible sheet positioned at a position corresponding to an upstream side in the conveyance direction is shorter than a length of a flexible sheet positioned at a position corresponding to a downstream side in the conveyance direction.

8. The toner conveying device according to claim 1,
wherein in the plurality of flexible sheets, a thickness of a sheet positioned at a position corresponding to an upstream side in the conveyance direction is larger than a thickness of a sheet positioned at a position corresponding to a downstream side in the conveyance direction.

9. The toner conveying device according to claim 1,
wherein the flexible sheet has a sheet thickness of 0.05 to 0.2 mm.

10. The toner conveying device according to claim 1, further comprising:
a horizontal conveyance passage communicating with an upper end of the drop conveyance passage and extending in a horizontal direction; and
another conveyor having a coil shape or screw shape and disposed in the horizontal conveyance passage, the conveyor configured to rotate in a specified direction to convey the toner in the horizontal direction.

11. An image forming apparatus comprising the toner conveying device according to claim 1.

12. A toner conveying device comprising:
a drop conveyance passage through which toner drops by its own weight;
an inclined conveyance passage communicating with a lower end of the drop conveyance passage and extending obliquely downward;

a conveyor having a coil shape or screw shape and disposed in the inclined conveyance passage, the conveyor configured to rotate in a specified direction to convey the toner obliquely downward; and a flexible sheet disposed in the drop conveyance passage and having a leading end to contact the conveyor, the flexible sheet configured to swing in conjunction with rotation of the conveyor, wherein the flexible sheet extends in a vertical direction and an upper end of the flexible sheet is fixed as a fixed end to an inner wall of the drop conveyance passage such that the leading end as a lower end of the flexible sheet is a free end, wherein at least one of the inner wall or the flexible sheet has a projection to incline a portion of the flexible sheet except the upper end in a direction away from the inner wall such that the leading end of the flexible sheet faces a rotation center of the conveyor, wherein the toner conveying device further comprises a plurality of flexible sheets including the flexible sheet disposed such that a plurality of leading ends of the plurality of flexible sheets are aligned along a conveyance direction of the conveyor; and a plurality of projections including the projection corresponding to the plurality of flexible sheets, and wherein in the plurality of projections, a height of a projection positioned at a position corresponding to an upstream side in the conveyance direction is higher than a height of a projection positioned at a position corresponding to a downstream side in the conveyance direction.

13. An image forming apparatus comprising the toner conveying device according to claim 12.

* * * * *